United States Patent Office 3,302,875
Patented Feb. 7, 1967

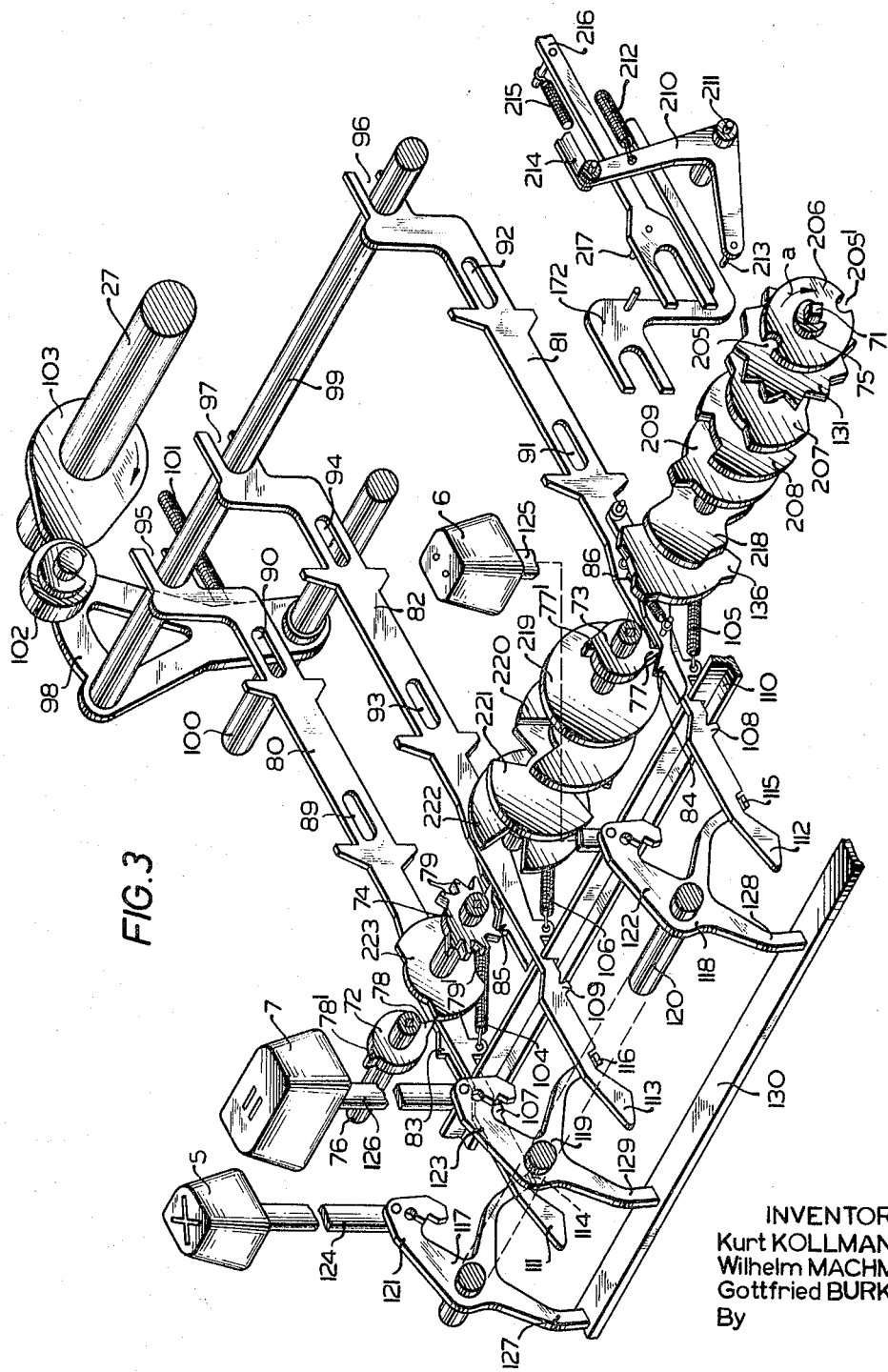

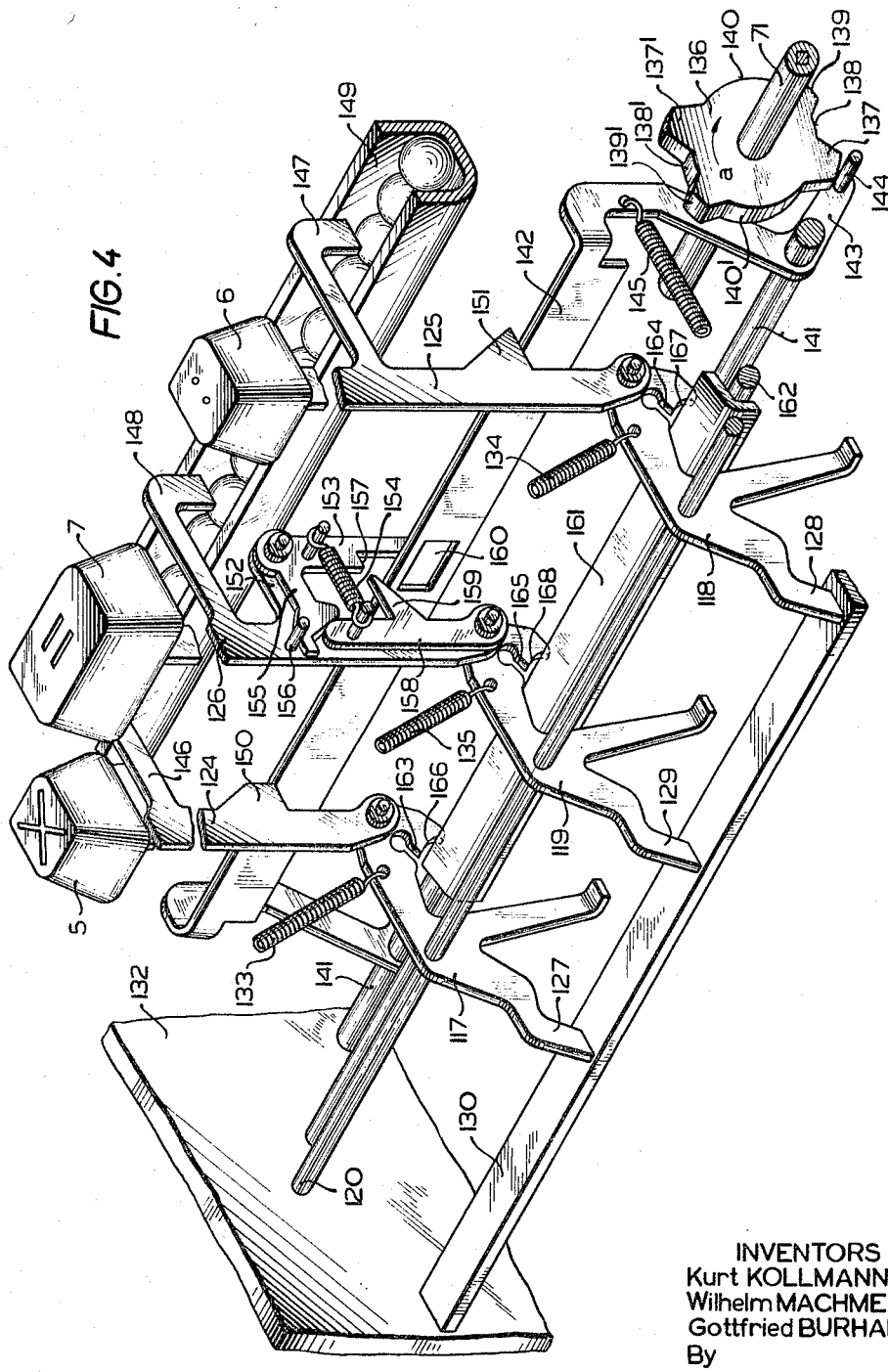

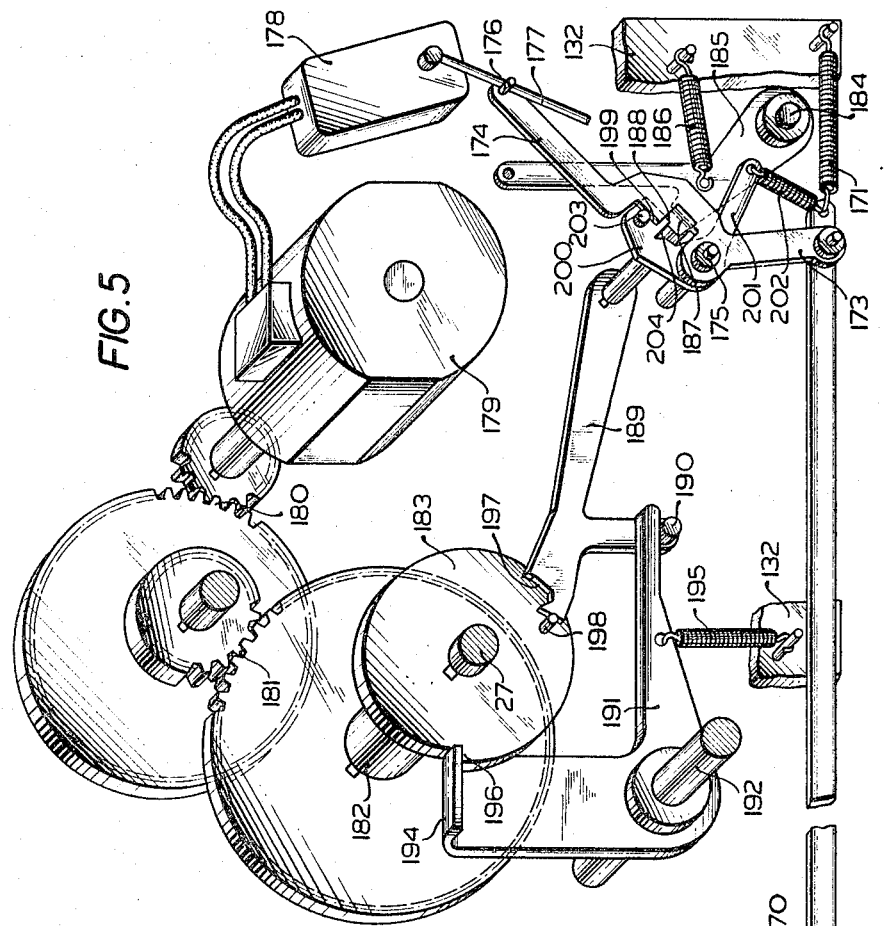

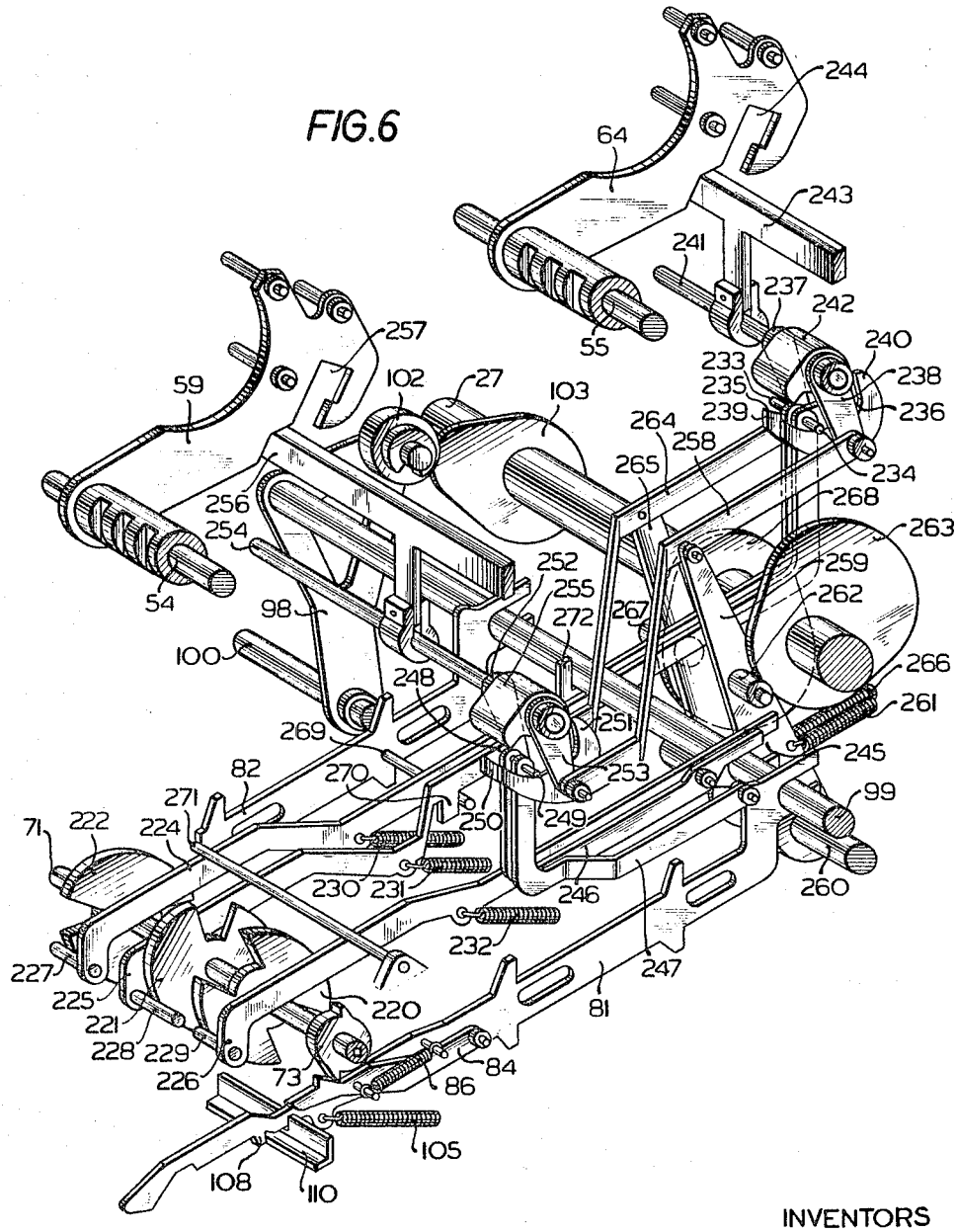

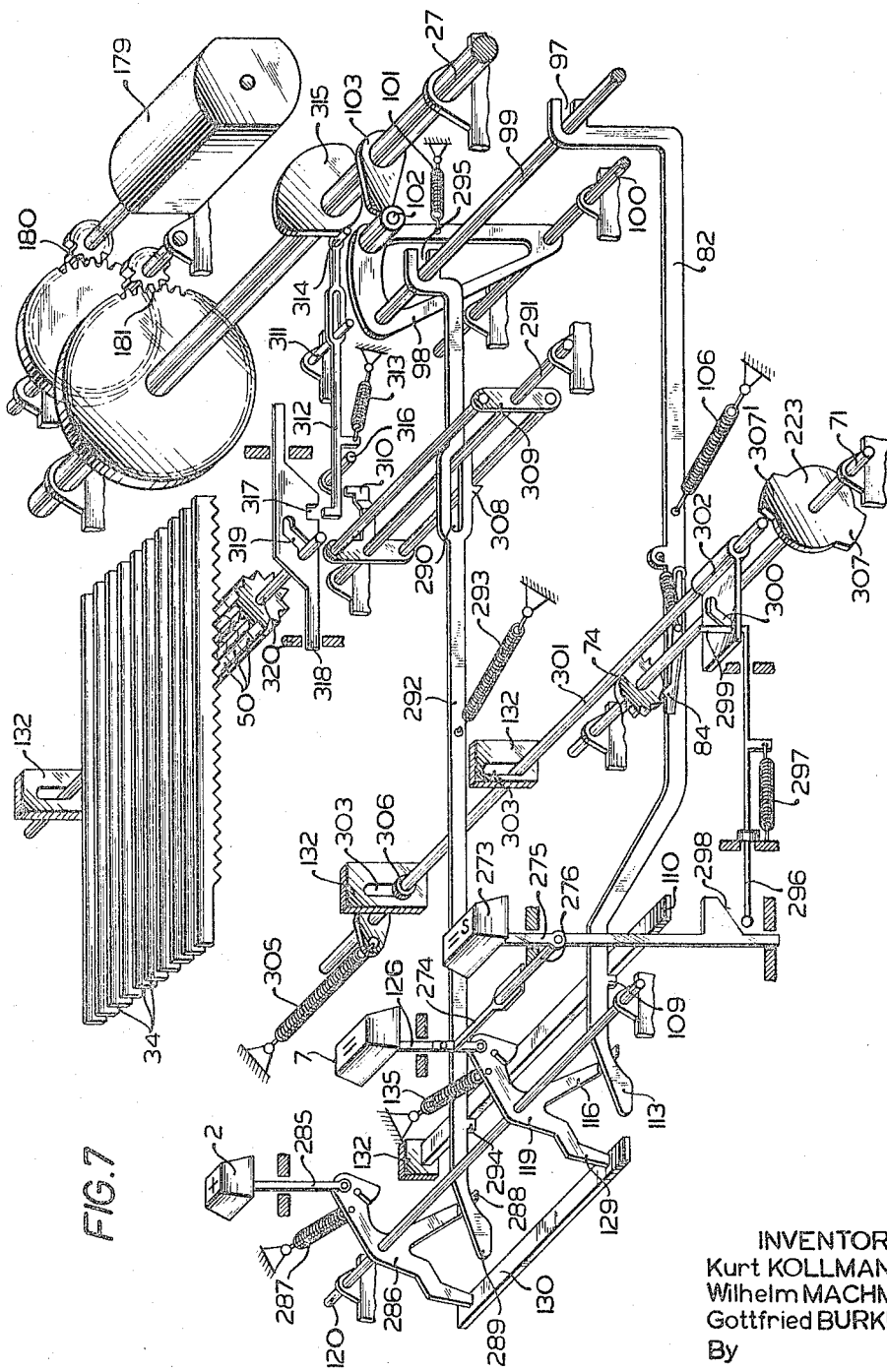

3,302,875
AUTOMATIC CONTROL DEVICE FOR
CALCULATING MACHINES
Kurt Kollmann and Wilhelm Machmer, Nurnberg, and Gottfried Burkhardt, Altenfurt, near Nurnberg, Germany, assignors to Firma Diehl, Nurnberg, Germany, a German Kommanditgesellschaft
Filed Oct. 19, 1964, Ser. No. 404,980
Claims priority, application Germany, Oct. 17, 1963, D 42,733
29 Claims. (Cl. 235—60)

Motor-driven, mechanical four-species calculating machines for fully-automatic carrying out of multiplications and divisions are known which have, specially for the operations of multiplication and division, a sum switching mechanism integral in the machine to accommodate the multiplicand or the divisor and further, on a counting mechanism slide adjustable in decades opposite the said sum switching mechanism, a main counting mechanism with a large number of positions, to accommodate the dividend or the product and also, on a counting mechanism carriage, a rotary counter with a small number of places to accommodate multiplier or the quotient. In order to perform a multiplication, the multiplicand is first fed into the sum switching mechanism and the multiplier into the rotary counter. The subsequent process of multiplication is such that the multiplicand stored in the sum switching mechanism, commencing with the units position of the multiplier, is multiplied step-wise and the result stored in the main counter. During this time, the counting mechanism carriage travels to the right from its initial position and, upon completion of the multiplication, is moved back to its left-hand starting position to furnish the result. For carrying out a division, the dividend is fed into the main counting mechanism and the divisor into the sum switching mechanism. The counting mechanism carriage is then adjusted sufficiently far out of its left-hand starting position for the highest occupied station on the main counter mechanism and sum switching mechanism to be superimposed, whereupon the actual process of division, consisting of subtractions and additions, commences. Again, during this process, the counting mechanism carriage is moved back stepwise into its left-hand starting position, in which the quotient is delivered.

Addition and substraction calculations are performed simply, circumventing the sum switching mechanism and the mechanisms in the counting mechanism carriage, by means of balancing mechanisms which serve also to store or take over results of multiplication or division processes. It is also known to provide in such calculating machines additional auxiliary or memory mechanisms into which, as desired, calculation values for multiplications or divisions or results of calculations can be fed and withdrawn again therefrom on request and fed into another mechanism.

In most cases, printing four-species machines also have a comma-printing device.

For fully-automatic calculations, such a machine calls for a number of auxiliary operations such as, for example, the engagement and disengagement of the particular mechanisms required, the releasing or holding of the counter mechanism carriage either out of or in the particular position corresponding to a pre-set decimal point setting and other operations.

It is the object of the present invention to provide for a machine as described above a centrally arranged device which prepares and/or cuts in and out all the auxiliary controls positively and in the correct sequence, as required for carrying out fully-automatic multiplication or division as well as for the subsequent storage of a result.

A feature of the invention resides in that a value contained in the inscribing carriage or in a storage mechanism may be conveyed as a multiplicand into the sum switching mechanism by operation of a *times*-key and into the main counting mechanism as a dividend by operation of a *divide*-key.

A further feature of the invention resides in the fact that the times and divide keys may have associated with them an is-key common to both types of calculation and which, by being operated after the times key, conveys a value present in a stylus carriage or in a storage mechanism into the rotary counter mechanism as a multiplier and subsequently initiates fully-automatic multiplication, including presentation of the product and switching off of a motor. By operating the is-key after the divide-key, the value is conveyed to the sum switching mechanism as a divisor, and subsequently, automatic division, ejection of the remainder from the main counter mechanism, presentation of the quotient by the rotary counter mechanism and switching off of the machine are all tripped.

A further feature of the apparatus according to the invention resides in that, by *repeated* operation of a *times*-key, the multiplicand which was initially fed in may be automatically extinguished and a fresh value drawn from a stylus carriage or a storage mechanism and fed to the sum switching mechanism.

It is a further feature of the invention that, after a multiplicand or a dividend has been fed into the calculating mechanism, operating processes consisting of *additions* or *subtractions* may be carried out, the results computed thereby being usable as a multiplier or divisor by subsequent operation of the is-key.

A further feature of the invention resides in that the auxiliary control device may be used via an *additional device* for locking the divide-key after operation of the times-key and, vice versa, locking the times-key after operation of the divide-key. Furthermore, the additional unit is used for locking the is-key in its basic position before actuation of the times or divide keys and in its tripped position after such actuation and until the entire calculating operation is completed.

A further feature of the apparatus according to the invention consists in that, by operating times, divide or is-keys, a motor may be switched on and the main shaft of the machine is released in each case for one revolution during which the particular key operated is locked in its tripped position.

A further feature of the invention resides in that, by actuation of a times, divide or is-key, the setting of the auxiliary control device to whatever is the next operation of the machine may pre-selected and is carried out during one revolution of the machine main shaft.

According to the invention, therefore, on a per se known programme control shaft provided with switching and controlling cams for engaging and disengaging adjusting, calculating and printing mechanisms, as well as their driving, controlling and conveying means, at least three differently toothed continuous-switching ratchet wheels are provided with which are associated at least three parallel slides individually releasable by operation of the function keys and provided with spring-loaded continuous-switching pawls, said slides carrying out a lifting movement, through switching means, upon a subsequent revolution of a machine main shaft having the effect of feeding in a value mechanically or furnishing a value, switching the programme shaft via the continuous-switching pawls, in a sequence corresponding to the multiplication or division cycle, stepwise and in such a manner that the said programme switching shaft is moved on from its zero position to the extent of two steps by the slide releasing the feed of a multiplicand, being moved on by one step by the second slide tripping the feed of a dividend and subsequently by the third slide said programme is shifted a plurality of times by two switching steps until it reaches its zero position. Said third slide rotates the programming switching shaft on the last stroke by only one step, into its zero position, if, at the start of the calculation, the second slide shifted said shaft by only one step.

Hence, two separate programmes valid for multiplication and division, are provided on the programme shaft which, for each calculation runs through both programmes, only those switch positions which apply to the particular calculation being however effective.

In the accompanying drawings, which show, by way of example, one embodiment of the invention:

FIGURE 3 is an exploded perspective view of a programme control device constructed in accordance with the invention and adapted for the calculating machine shown in FIGURES 1 and 2;

FIGURE 4 is an exploded perspective partial view of a function keyboard with an additional unit controlled by a programme switching shaft, for correct-sequence locking of the function keys;

FIGURE 5 shows an arrangement for switching on a driving motor and a main coupling of the calculating machine by the function keys, and is a simplified perspective view;

FIGURE 6 is a perspective partial view of a programme control shaft constructed in accordance with the invention, with a device, controlled by said shaft, for swivelling main and rotary counter mechanisms;

FIGURE 7 is a diagrammatic partial view of a programme control device constructed in accordance with the invention with a result storage device is controlled by it, and FIGURE 8 is a perspective view of certain parts shown in FIGURE 7, and associated parts.

*Design of the calculating machine*

The four-species calculating machine, shown in the said drawings, to be described in greater detail hereinafter, has essentially an input unit consisting of a tens keyboard and a stylus carriage, a calculating mechanism consisting of, integral with the machine, a sum switching mechanism and, mounted on a slideable counting mechanism carriage, a main counter mechanism, together with a rotary counter mechanism and, for recording all the figures and symbols involved in the carrying out of calculation operations, a printing unit. Furthermore, for addition and subtraction sums, there are totalising units and also one or more auxiliary or memory units for storing values.

For driving the calculating machine, there is an electric motor, switched on by a function keyboard and driving, through appropriate transmission gearing and a per se known single-rotation coupling, the shaft of the sum switching mechanism and, through a similarly known single-rotation coupling, the machine main shaft which, in conjunction with the auxiliary control device and through racks which can be moved back and forth in the calculating machine, carries out the known operations such as value input and output, return of the stylus carriage and the like.

Figure 1:
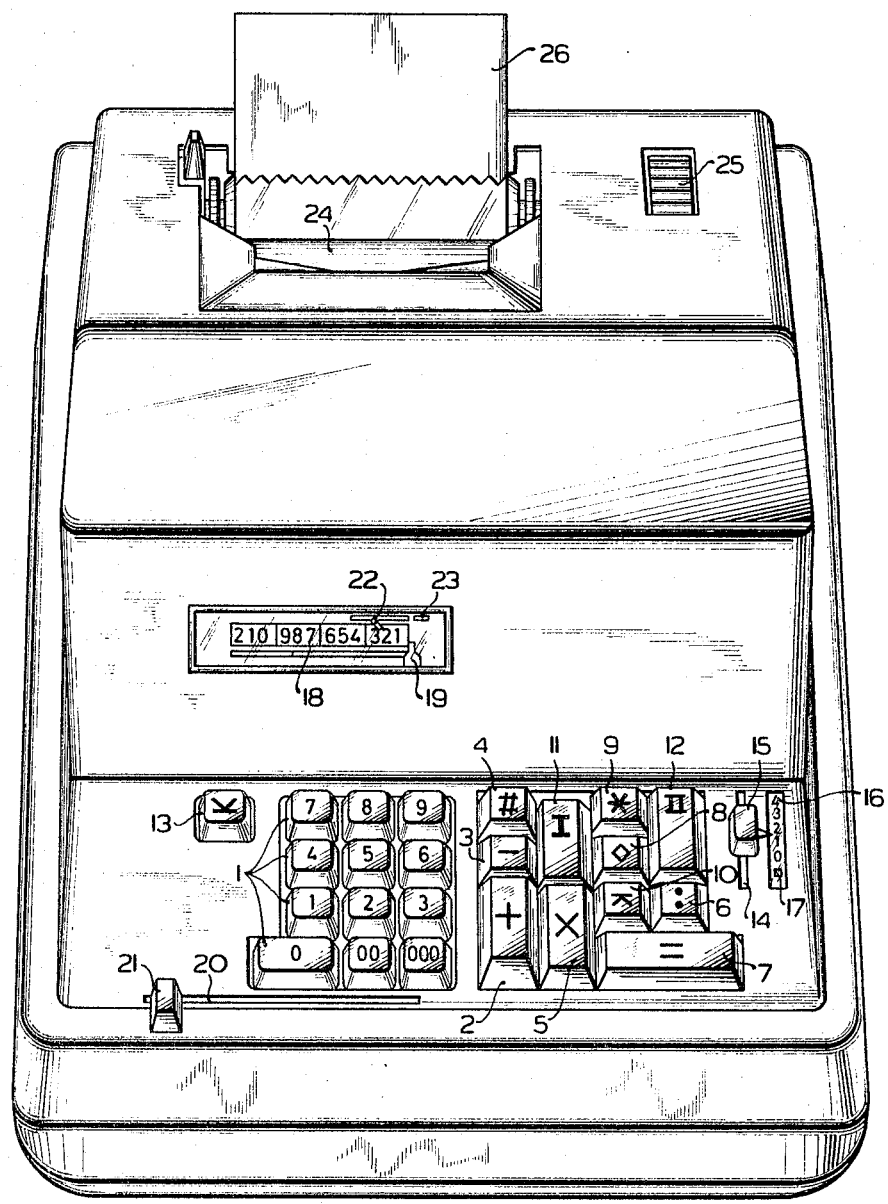
FIGURE 1 shows a four-species calculating machine, equipped with apparatus in accordance with the invention, viewed from above.

As FIGURE 1 shows, the calculating machine has, in front and at its upper surface, a number of tens keys 1 which are numbered 1 to 9 and three keys marked 0, 00, 000 serving to feed in zeros. On the right, alongside the tens keys 1, is a set of function keys, comprising an addition key 2, a subtraction key 3, a non-calculating or number printing key 4, a times-key 5, a divide-key 6, a result or is-key 7, an intermediate total key 8, a final total key 9 and a constant signal key 10, these keys being provided with symbols to suit their function. For calling two storage units provided in the machine, the function key area includes two keys 11 and 12 for selecting the storage unit and marked I and II. On the left, alongside the tens keys 1, there is a constant set key 13. On the right, alongside the function keys, there is a comma setting button 15 provided with a pointer and sliding along a slot 14, said button being adapted to adjust a fixed point. On the right, alongside the setting button 15 is a scale 16 comprising the figures 0 to 4 for reading off the decimal point number set. A mark 17 provided at the bottom end of the scale 16 serves for pre-setting a division with the maximum possible quotient.

Above the tens keys 1 on the calculating machine, there is a further scale 18 on which, by means of a pointer 19 connected with the stylus carriage, the number of places occupied in the stylus carriage is indicated. For manual clearance of the values fed into the stylus carriage, an operating button 21 slideable along a slot 20 is provided. Above the scale 18 is a slideable pointer 22 to indicate the particular setting of the setting button 15. A mark 23 above the scale 18 corresponds to the mark 17 on scale 16. At the top of the machine, towards the rear, there is a printing mechanism 24. In an aperture on the right-hand upper end of the cover, there is access to a handwheel 25 which is provided for manual transport of a paper strip 26, on which the printing appears, and which emerges from the calculating machine.

Figure 2:
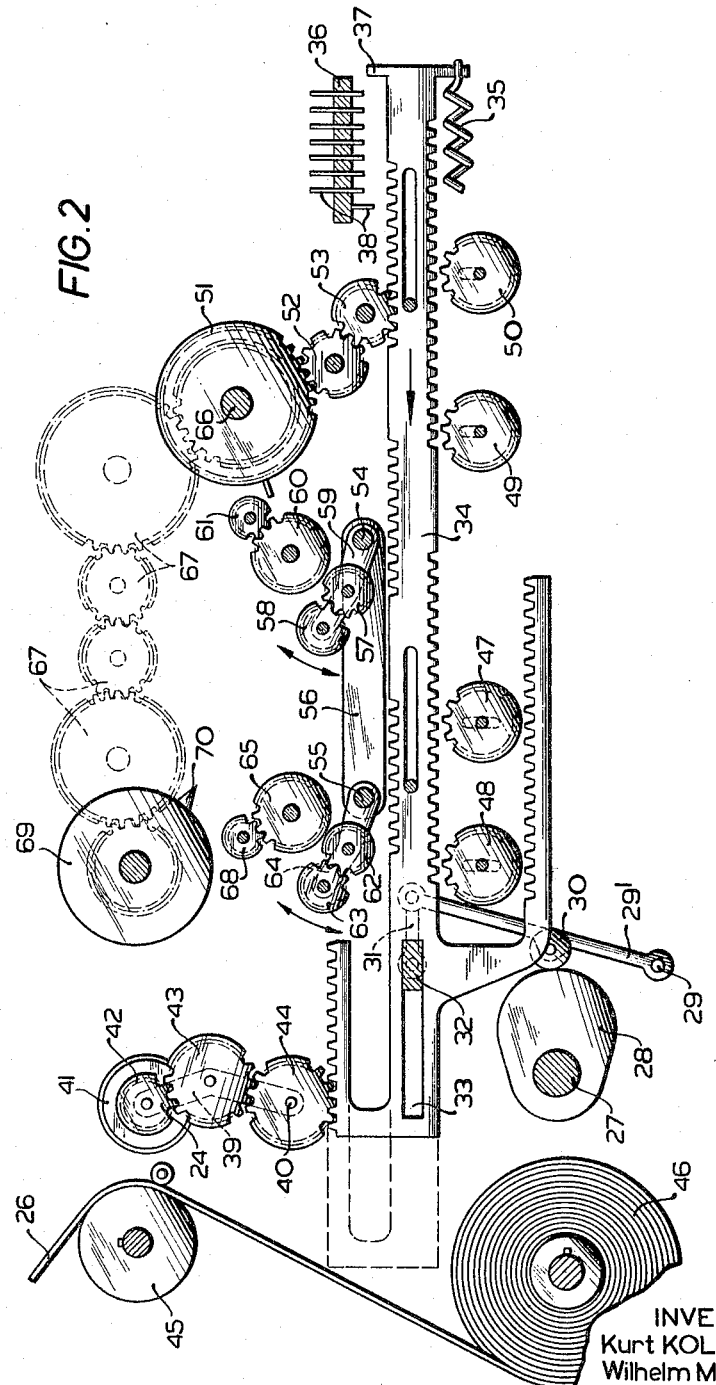
FIGURE 2 is a diagrammatic view of the calculating machine shown in FIGURE 1, to explain its design.

FIGURE 2 shows diagrammatically the arrangements provided in the machine for value input and output and for carrying out the calculation operations, without the associated control linkage, in a side elevation.

Fixed on a machine main shaft 27 mounted in the frame of the machine is a cam 28 against which rests a follower wheel 30 arranged on lever 29' which is pivotally mounted about spindle 29 in the machine frame. Lever 29 is connected at its upper end through a rod 31 in articulated fashion to a beam 32 slideably mounted in recesses 33 in racks 34. At every rotation of the main shaft 27 of the machine, cam 28 causes the beam 32 to be displaced leftwards, so that the racks 34, under the traction of a spring 35 engaging on each rack 34, are likewise moved rearwards. For taking-over a value from a stylus carriage 36 slideable transversely to the racks 34, the latter have, at their front ends, a stop 37 by which they abut against a stylus or pin 38 of the stylus carriage 36 which is set by the value keys 1 (FIGURE 1).

The printing mechanism 24 shown in FIGURE 1 consists essentially of printing hammers 39 which are pivotally mounted on a spindle 40. Rotatably mounted on the upper end of the printing hammers 39 are printing wheels 41 which are in permanent driving connection through transmission wheels 42, 43, 44, so that the value received by the racks 34 can be printed on a paper strip 26 transported stepwise through a paper roller 45. Paper strip 26 is drawn from a roll 46. Reference numerals 47 and 48 designate totalling mechanisms which may be operated as desired by selector keys 11, 12 and engaged upwards or downwards in the racks, 34 for plus and minus calculations. Underneath the racks 34 is an auxiliary storage device 49 which may be operated by the constant setting key 13 and which may be called upon by depressing the constant calling key 10. On the right, alongside the auxiliary storage unit 49, is a second auxiliary storage unit 50 which is automatically coupled with the racks 34 before every forward movement of said racks, and always stores which ever was the last value.

Arranged above the racks 34 is a sum switching mechanism 51 consisting for example of wheels and accommodating the multiplicand or the divisor and which, in order to receive values, can be coupled by laterally displaceable gearwheels 52 and 53 to the racks 34 when desired. The sum switching mechanism is arranged on a calculating shaft 66. Furthermore, above the racks 34, is, transversely to these, a counting mechanism carriage 56 mounted on two carriage guide axles 54, 55. In the counting mechanism carriage 56 is a main mechanism 57, 58, accommodating the dividend or the product and pivotable upwards and downwards, in a frame 59, about the carriage guide axle 54, being moved downwardly for input and output of values and upwardly for coupling to the sum switching mechanism 51 through transmission wheels 60, 61, which are mounted on relatively-fixed parts of the machine. According to the type of calculation involved, wheels 57 or, by a half-step of carriage 56, wheels 58, are brought into engagement with transmission wheels 60. In the same way, a rotary counter mechanism 62, 63 to accommodate the multiplier or the quotient is provided, on the counter mechanism carriage 56, in a frame 64 and is pivotable upwards and downwards about the carriage guide axle 55. For value input and output, this mechanism, too, is moved downwardly into the corresponding teeth of racks 34, and upwardly to engage with gear wheels 65 for calculation processes, said gear wheels being mounted on a relatively-fixed part of the machine. The rotary, counter mechanism 62, 63 is driven by a set of gearwheels 67 shown in broken lines in FIGURE 2 and in driving engagement with calculating shaft 66 and a switching tooth 70 provided on a wheel 69 and acting through transmission wheels 68.

*Auxiliary control unit*

The construction and mode of operation of the auxiliary control unit arranged in the machine is to be described with reference to FIGURE 3. In this arrangement, a programme switching shaft 71, having the form of a square-section shaft, is rotatably mounted in the machine. On it are control cams, to be explained later, and three continuous-switching wheels 72, 73, 74, the same being axially secured by shaft keys 75 and spaced by sleeves 76. Programme shaft 71 is rotatable through 360° in twelve individual steps. Six switching steps embrace a complete programme in which all the auxiliary operations necessary for a multiplication and a division are tripped. Continuous-switching wheels 72, 73, 74 therefore repeat their teeth in the second half whilst the switching and control cams repeat their cam shape.

Of the wheels 72, 73, 74 mounted on programme shaft 71, wheels 73 has, on one half of its periphery, a tooth 77, whilst wheel 72 similarly has a tooth 78 staggered by 30° in respect of tooth 77, and wheel 74 has four teeth 79, the first tooth 79 being staggered by 60° in respect of tooth 77. The teeth in the second halves of the continuous-switching wheels, 72, 73, 74 are designated by 77', 78' and 79'.

For continuous-switching of wheels 72 to 74, pawls 83, 84 and 85 are pivotally arranged on switching slides 80, 81, 82, said pawls being held in the teeth 77, 78, 79 on switching wheels 72 to 74 by the traction of spring 86 visible in FIGURE 3 only at the pawl 84 but engaging on all pawls 83, 84 and 85 and on slides 80, 81, 82. Slides 80, 81, 82 are approximately horizontally slideable by means of longitudinal apertures 89, 90, 91, 92, 93, 94 and, at their rearward ends, have U-shaped recesses 95, 96, 97, which engage over a rod 99 attached to a swivelling member 98 mounted on an axle 100 carried by a relatively-fixed part of the machine and held by the force of a spring 101 against a cam 103 on the main shaft 27 of the machine, through the agency of a follower wheel 102 which is rotatably mounted on the aforesaid member 98.

Engaged with slides 80, 81, 82 are springs 104, 105, 106, which can hold slides 80, 81, 82 in their basic position in conjunction with hook-shaped shoulders 107, 108, 109 engaging an angle rail 110 provided with cut recesses for laterally guiding of the slides.

At their front end, slides 80 to 82 are provided with downwardly directed switch shoulders 111, 112, and 113 which are gripped from underneath by bent-over lugs 114, 115, 116 of crank levers 117, 118, 119 which are pivotally mounted on an axle 120 rigid with the machine. To slantingly rearwardly projecting arms 121, 122, 123 thereof are pivoted shanks 124, 125 and 126 of the times-key 5, divide-key 6 and is-key 7. Crank levers 117 to 119 are, in their basic position, arranged to engage, through arms 127, 128, 129, a rail 130 rigid with the machine.

When one of the keys 5, 6, or 7 is operated, the associated slide 80, 81 or 82 is raised through the corresponding crank lever 117, 118 or 119 and will then be held in its basic position only by rod 99. When the main shaft of the machine 27 then turns, slide 80, 81 or 82 moves rearwardly through the action of spring 104, 105, or 106. When this happens, pawl 83, 84 or 85, of whichever slide 80, 81 or 82 has been tripped, slides over the back of teeth 77, 78 or 79, travelling accordingly over one or two teeth to the rear. Towards the end of the main shaft revolution, rod 99 pushes the tripped slide 80, 81 or 82 positively back into its starting position, in which case the aforesaid pawl 83, 84 or 85 moves the associated continuous-switching wheel 72, 73 or 74 by either no step at all or by one or two steps, as the case may be. In its rest position, the previously tripped slide 80, 81 or 82 re-engages, through shoulder 107, 108 or 109, the angled rail 110 when the previously depressed key 5, 6 or 7 is released and returned to its basic position.

Among other parts, there is on the programme shaft 71 a ratchet wheel 131 which, in conjunction with a ratchet pawl (not shown), provides for the adoption by the programme shaft 71 of an accurate switching position without performing any wild movement through centrifugal force.

As already mentioned, the wheel 73 which is operated by the divide-key 6 via the slide 81 has only one tooth 77 or 77' for each switching rhythm, said tooth, in the zero position of programming shaft 71 as shown, being so disposed in the range of movement of pawl 84 that it is only in the second half of the forward movement of the slide 81 that the pawl 84 contacts tooth 77 or 77' and ensures that the programme shaft 71 moves forward by only one switching step. In contrast, wheel 72 which is operated by the times-key 5 is provided with teeth 78, 78' staggered by 30° in respect of teeth 77, 77', said teeth 78, 78' being, in the illustrated zero position of programming shaft 71, so disposed in the range of pawl 83 of slide 80, that the programme shaft 71 is shifted forward by two switching steps upon forward movement of the slide 80.

As has likewise already been stated, wheel 74 which is operated by the is-key 7 has two sets of four teeth 79, 79', which are so arranged that, when the is-key 7 is actuated after the divide-key 6 or times-key 5 has been depressed, programme shaft 71 is turned further on by two steps in each case. Only in the last phase, after previous depression of the divide-key 6, is the programme shaft 71, due to the absence of a switching tooth on wheel 74, finally likewise moved by only one switching step into the basic position which is equivalent to 180° pivoting.

For division and multiplication, therefore, there are two completely different, interlocked switching rhythms. If the individual switching positions adopted during half a revolution of programme shaft 71 are designated zero I, II, III, IV, V, VI=zero, then during division, it will pass through the positions zero, I, III, V, zero and, for multiplication, positions zero II, IV, zero. Thus, the following processes of the machine can be associated to these two switching rhythms:

For division, depression of the divide-key 6 produces input of the dividend during one rotation of the machine main shaft 27, the programme shaft 71 being in the end in position I. By subsequent depression of the is-key 7, the divisor is fed in during a second revolution of the main shaft and, finally the programme shaft 71 comes to position III. After calculation, and during a further rotation of the main shaft, the remainder is ejected and the programme shaft 71 switched on to position V and, finally, during the fourth rotation of the main shaft, the quotient is printed and, towards the end of the rotation, programme shaft 71 is brought to position VI=zero. For multiplication, the multiplier input is achieved by means of times-key 5, after which programme shaft 71 is moved to position II, the multiplier being fed in by is-key 7 and the programme shaft switched on to position IV; after the calculation and during ejection of the product, programme shaft 71 is switched further on into position VI=zero.

As will be further explained hereinafter, an already fed-in multiplicand may be changed by further input of a different value. If, therefore, slide 80 is moved back and forth a second time, pawl 83 remains ineffective and the programme shaft 71 remains in position II.

Locking the keys

As described, slide 82 which is tripped by is-key 7 understakes a plurality of further switchings of programme shaft 71 during a calculation operation. After the first stroke movement, therefore, its shoulder 109 must not be retained against rail 110, which can be achieved by holding firm is-key 7 in the tripped position during the entire calculation process. In order not to leave this task to the operator, the embodiment now being described provides for an additional unit controlled by the programme shaft 71 to act as an auxiliary control unit in the machine; said auxiliary control unit being shown in FIGURE 4. This additional unit has been so elaborated that it allows of operation of the times-key 5, divide-key 6 and is-key 7 only in a definite sequence.

Axle 120 of crank members 117 to 119 is, as FIGURE 4 shows, fixed in the machine frame 132, of which however only the lefthand wall is shown. On crank members 117 to 119 engage springs 133, 134, 135 which hold function keys 5 to 7 in their upper basic position which is established by abutment of arms 127 to 129 on rail 130. On the programme shaft 71, of which only a portion is shown, is attached a cam 136 which, viewed in the afore-described switching position "zero" has a tall projection 137, in said zero position, a dip portion 138 in position I, a projection 139 on a middle radius in position II and a curved face 140 in the positions III to V, corresponding to the radius of the dip portion 138. Reference numerals 137', 138', 139' and 140' represent the same parts at the other half of the cam member 136. Controlled by cam 136 is a rail 142 which is pivotally mounted on a spindle 141. Spindle 141 is attached to both sides of the machine 132. In an arm 143 of rail 142 is projecting laterally thereof, a pin member 144 which rests against cam 136 due to the force of a spring 145 engaging on the rail 142.

Key shanks 124 to 126 have laterally-extending arms 146, 147, 148 which, by actuation of keys 5 to 7, engage in a known type of ball lock 149 into which emerge similar laterally-extending arms of function keys 2, 3, 4, 8 and 9. The effect achieved by the ball lock 149 is that only one function key can be actuated at any one time.

Furthermore, key shank 124 of times-key 5 has a stop member 150, the point of which is cut off. Shank 125 of divide-key 6, on the other hand, has a unshortened projecting nose 151. Finally, key shank 126 of is-key 7 is provided with an arm 152 on which a stop pawl 153 is pivoted and, under the pull of a spring 154 engaging therewith, applies its arm member 155 against a pin member 156 of key shank 126. Pawl 153 has a stop 157. On key shank 126 is preferably, at the joint with reversing lever 119, a further pivotally mounted ratchet pawl 158 having a projection 159. On the upper end of ratchet pawl 158 is the spring 154 which engages at the other end with stop pawl 153, holding ratchet pawl 158 against arm 155 of stop pawl 153. Associated with projection 159 is a recess 160 provided in the rail 142.

As can be seen in FIGURE 4, rail 142 is pivotable into three different positions by cam 136. In the zero position of programme shaft 71 as illustrated, pin member 144 is at the end of the tall projection 137, causing rail 142 to adopt the position in which it is swung farthest rearwardly. Depression of the is-key 7 causes stop 157 of stop pawl 153 to bear on the rail 142, i.e. the is-key 7 cannot be actuated. The times-key 5 and divide key 6, on the other hand, can be operated because their projections 150, 151 slide past rail 142. After operation of the divide-key 6, programme shaft 71, after turning in the direction of arrow a through 30°, takes up position I, and pin member 144 rests in the recess 138, causing rail 142 to adopt its farthermost forward position. Hence, said rail engages under projection 150 of times-key and projection 151 of divide-key 6 and locks both keys 5 and 6 in their basic position, so that only is-key 7 can be operatively actuated. When said key is actuated, then pawl projection 159 strikes the top edge of rail 142 and is deflected, tensing the spring 154, until it reaches the recess 160 and engages therein. This causes the is-key 7 to be locekd in its tripped position and the slide 82 associated therewith (FIGURE 3) for shifting programme shaft 71 on into positions III, V, VI, is held in the tripped position. In position VI, i.e. shortly before completion of a division cam 137' again swivels rail 142 rearwardly to strike the stop pawl 153, deflecting the latter against the force of spring 154 sufficiently for the recess 160 to release the shoulder 159 of ratchet pawl 158 and for spring 135 to to pull the is-key 7 into its basic position. With the subsequent forward travel of the slide 82, this latter is therefore likewise locked in its basic position.

If, at the commencement of a calculation, operation of the times-key 5 turns programme shaft 71 into position II, in other words through 60°, then pin member 144 rests on the middle projection 139 and causes rail 142 to move into its middle position. This action causes projection 151 to lock the divide-key 6 whilst the times-key 5 is released by the shortened projection 150 so that it can once again feed-in a fresh multiplicand, the is-key 7 being free to feed-in a multiplier. After operation of the is-key 7, the latter is, as has already been described, locked in its tripped position by ratchet pawl 158 until programme shaft 71 is again rotated into its zero position through position IV.

Switching on the driving motor and tripping the main coupling of the machine

In order to prevent a further function key being operated directly after actuation of one of the function keys 2 to 9 and during that process of the machine which has been initiated thereby, since such further actuation would upset the entire programme of the machine, there is provided in the machine an additional device which holds each function key 2 to 9 in its tripped position after operation and until completion of the particular working operation and which, simultaneously and additionally to the ball lock arrangement 149, locks all the other function keys in their inoperative position. Ball lock 149 only serves to prevent two function keys being operated at the same time.

The arrangement is also of importance to the proper further-switching of programme shaft 71 because, as already described, at the start of a multiplication or division, only the is-key 7 is locked by the rail 142, whilst the times-key 5 and divide-key 6 can be operated. If, for example, the divide-key 6 were to resume its top basic position immediately after being operated and after the motorised dividend input had been initiated, then, as long as programme shaft 71 is in its zero position, the times-key 5 could be depressed at once, tripping slide 80 (FIGURE 3) in addition to slide 81.

As FIGURE 4 shows, a rail 161, which is pivotally mounted in machine frame 132 on shaft 162, is associated with the crank levers 117, 118 and 119 as well as, in a manner not illustrated, with the other function keys, 2, 3, 4, 8 and 9. Crank levers 117 to 119 each have a slanting slot 163, 164 or 165 and an arcuate stop edge 166, 167 and 168. Rail 161 adopts such a position in respect of slots 163, 164 and 165 that the rail 161 is gripped even with quite a short key travel, thus reliably avoiding any excessive travel of rail 161 by a short and staccato blow on a key, i.e. the machine is either not switched on or the corresponding key is also depressed.

By the pivoting of rail 161 clockwise, as is illustrated in FIGURE 5 a driving motor 179 is switched on and the main shaft 27 of the machine is coupled with the motor 179 by means of a known single-revolution coupling 183. The arrangement is already known and will only be briefly explained here.

Mounted on shaft 162 of rail 161 is an arm 169 which, as rail 161 pivots, and through a traction rod 170 which is jointed to arm 169, causes a double-armed lever member 173, 174, which is pivotally mounted on a spindle 175 rigid with the machine, to rotate against the force of a spring 171 engaging the rod 170 and wall 132 of the frame.

At this, a shift pin member 176 mounted in lever arm 174 causes arm 177 of switch 178 to be turned so that driving motor 179 is switched on to drive, through gearwheel transmission 180, 181 and a sleeve 182 mounted on machine main shaft 27, a coupling wheel of the single-rotation coupling 183, said wheel being not shown in the diagram.

On the right-hand end of a shaft 184 passing transversely through the machine is attached a lever 185 which, in its basic position, has an angled lug 187 applied against an edge 188 of lever 173, 174, said edge being at right-angles to lug 187. By the pivoting of lever 173, 174, edge 188 releases lug 187, allowing lever 185 to pivot in a clockwise direction by the force of a spring 186 attached to it and to the frame wall, 132 until lug 187 abuts against a stop edge 199 of lever 173, 174 virtually at right-angles to edge 188. Lever 173, 174 and, hence, switch 178 is thereby held in the switched-on position and, via traction rod 170 and rail 161, the particular function key 5, 6 or 7 which is depressed is held in its tripped position. On the left-hand end of shaft 184 is attached a lever 189, which by pivoting of shaft 184 in a clockwise direction, causes, through the agency of a pin member 190 mounted at the side of lever 189 tripping lever 191 to pivot. Tripping lever 191 is pivotally mounted about a spindle 192 rigid with the frame and is held in its inoperative position, under the action of a spring 195, by angled lug 194, which serves as a tripping pawl abutting against a projection 196 on the machine main coupling 183, the latter being disengaged in known manner.

Pivoting of tripping lever 191 causes pawl 194 to release coupling 183 for one revolution. At the end of this revolution, lever 189 is brought into its basic position by a pin member 198, mounted on the side of the main coupling 183, bearing on a switching edge 197 of lever 189, and coupling 183 is disengaged.

This returning action occurs so suddenly that, as a retaining means, a detent 200 is provided on spindle 175 and, in the basic position, said detent is held against stop edge 199 of lever 173, 174 through the agency of pin member 203 mounted on the side of detent 200 and by the force of a spring 202 connected between rod 170 and an arm 201 of detent 200, whilst, in the tripped position, it abuts on the lug 187 of lever 185.

When lever 185 is restored to its basic position, the said lever receives an excess lift, so that detent 200 slides along the top of lug 187 and its edge portion 204, located approximately parallel to edge 188 but protruding somewhat in respect thereof, comes to rest in front of lug 187 and holds the same firm until lever 173, 174 pivots in a clockwise direction and, via pin members 203, entrains detent 200 sufficiently for the same to release lug 187 and for said lug, under the action of spring 186, to return to the position where it abuts against edge 188 of lever 173, 174. With the restoration of lever 173, 174 to its basic position, also, the depressed key 5, 6 or 7 is released via the rod 170 and rail 161.

The detent 200, however, also has the task of preventing the machine main coupling 183 being re-engaged when the particular function key 5, 6 or 7 which is depressed is being held in its tripped position by the operator. In this case, lever 173, 174 remains pivoted until the particular function key 5, 6 or 7 is released and the motor 179 thereby switched on, whilst the detent 200 however holds the lever 185 firm in its basic position so that coupling 183 cannot be engaged.

*Auxiliary operations which can be tripped and/or controlled by the programme shaft*

As already mentioned and as can be seen from FIGURE 3, a number of cams are attached on the programme shaft 71 for controlling or tripping the individual auxiliary operations, said cams preparing through linkage systems, an operation which is tripped by the machine main shaft 27 when it next rotates. In the following section, the mode of action of the cams shown in FIGURE 3 will be briefly described.

On the right-hand end of programme shaft 71 is a cam 206 provided with two oppositely disposed recesses 205, 205'. As is already known a decimal setting device is locked by this cam 206 in switch positions I to V of programme shaft 71, so that no readjustment of the decimal point is possible during a calculating operation. Cam 207 co-operates with an angle lever 210 which is pivotally mounted on a pin 211 rigid with the machine. Angle lever 210 is held through a pin 213 against cam 207 by the force of a spring 212 and, in switching positions III, IV and V, and through a linkage 214, renders inoperative a device which locks the counter mechanism carriage 56 (FIGURE 2) in its adjusted decimal position. Furthermore, cam 207, acting through a linkage (not shown) serves to lock a rack scanning device of a capacity safety device, which does not form part of the invention.

The force of spring 215 holds a pin 217 secured in a linkage 216 against cam 208. In the switch positions III and IV, cam 208 releases the counter mechanism carriage from its zero position for unimpeded carrying-out of the multiplication and division cycle.

Cam 209 is used for holding the counter mechanism carriage 56 in position IV for a correct-position delivery of the product, and also for engaging a multiplication control arrangement and for disengaging a division control arrangement. A thrust member 172 co-operates with cam 209.

A cam 218 serves for adjusting the symbol printing wheels arranged in the printing mechanism whilst cam 136, as described, serves for alternate locking of the times-key 5, divide-key 6 and is-key 7. On the left of switching wheel 73 is a guide disc 219 and three control discs 220, 221 and 222, all being mounted on programme shaft 71. Said control discs serve to engage the main counting mechanism 57, 58 and rotary counter mechanism 62, 63 in the racks 34 and will be explained in greater detail hereinafter. A cam 223 arranged between switching wheels 72 and 74 prevents the stylus carriage being pulled in, during switch position IV and V, in other words while the product or quotient are being presented, so that during these operations, a fresh value can be fed into the tens keys 1 (FIGURE 1). Furthermore, cam 223, as will be described in greater detail hereinafter, serves to pre-release a result storage arrangement.

*Engagement of the calculating mechanism*

The controlling or preparing of an auxiliary operation by a cam on the programme shaft and subsequent tripping by the machine main shaft will now be described with reference to an example. In the example, the engagement of the main counting mechanism and rotary counting mechanism with the racks, for input or output of a value, will be discussed.

FIGURE 6 shows a portion of the programme shaft 71 with switching wheel 73 and cams 220, 221 and 222, as well as slide 81 which is capable of being tripped by divide-key 6, and a portion of slide 82 associated with the is-key 7, together with the rail 99 controlled by the machine main shaft 27. Furthermore, the carriage guide spindles 54, 55, already mentioned, together with the right-hand frame 59 of main counting mechanism 57, 58 and the right-hand frame 64 of the rotary counting mechanism 62, 63, mounted pivotally on the aforesaid spindles 54, 55, can also be seen.

Pins 227, 228 and 229 mounted on the side of control bars 224, 225 and 226 are held against cams 220, 221 and 222 by springs 230, 231 and 232 engaging on control bars rods 224, 225 and 226. Controls bars 224, 225 have on rear upwardly-bent ends shift pins 233, 234 which bear on curved switch edges 235, 236 of coupling members 239, 240 pivotally arranged on tie-members 237, 238. Tie-members 237, 238 are in turn pivotally mounted on a shaft 241 mounted in the machine. Between the two tie-members 237, 238 is attached a switching member 242 mounted on shaft 241. Rigidly connected to shaft 241 is a switching frame 243 on which frame 64 of the rotary counting mechanism rests when in its basic position. By clockwise pivoting of shaft 241, switch frame 243 engages in a recess 244 of frame 64 and draws the latter downwardly until wheels 62 (FIG. 2) engage in the racks 34.

A U-shaped recess 245 in control bar 266 engages over rod 99. Pivotally connected to the rearward end of switch rod 266 and of slide 81 of divide-key 6 is in each case a forwardly directed, upwardly angled lever 246 or 247. Each lever 246, 247 in turn has a lateral pin 248, 249 which abuts on a coupling member 250, 251 which are in turn pivotally arranged on tie-pieces 252, 253 which are pivotal on a shaft 254 mounted in the machine frame. Between the two tie-members 252, 253 there is rigidly connected to shaft 254 a switching member 255 and, on the left of the same, a switching frame 256. On switching frame 256 bears frame 59 of the main counter mechanism which, by swivelling of switching frame 256, can likewise be shifted downwards, switching frame 256 thereby engaging in a recess 257.

Tie-pieces 253 and 238 are pivotally connected by a bar 258 which is pivoted on a roller arm 259, approximately in the middle thereof. Roller arm 259 is pivotally mounted on a spindle 260 rigid with the machine and bears, by the force of a spring 261, on cam 263 on machine main shaft 27, through the agency of a roller or wheel 262.

The two tie-members 252 and 237 are similarly pivotally connected with each other via a bar 264 and are displaceable by a roller arm 265 mounted on spindle 260 and pivoted to rod 264, said arm 265 being applied by the force of a spring 266 and through the agency of a roller 267, against a cam 268 of the machine main shaft 27. Cams 263 and 268 are virtually identical to each other but are staggered by 180° relative to each other. Bars 258 and 264, which are pivoted to tie-members 237, 252 and 238, 253 are therefore, at each revolution of the main shaft, pushed reciprocatingly to and fro with a different rhythm, due to the shape of cams 263 and 268, without however engaging any mechanism. The choice of the mechanism to be engaged is made through the medium of programme shaft 71.

Mounted laterally on the slide 82 of is-key 7 is a pin member 269 which engages a step 270 on control bar 225, allowing this latter to be displaced rearwardly only when slide 82 is likewise tripped and can perform a travelling movement. At the same time, pin 269 serves to return operating rod 225 to its basic position. For restoring operating rod 224 to its basic position, the latter has a stop member 272 which bears on rail 99 by the action of spring 230.

Furthermore, a pin-member 271 is attached in the machine frame which engages over bars 224 to 226 and prevents the same being lifted as programme shaft 71 is progressively shifted.

As already described, in order to take a dividend in the zero position of the programme shaft and in order to furnish a division remainder in position III and deliver a product in position IV, the frame 59 of the main counting mechanism must be brought into engagement with racks 34.

Frame 64 of the rotary counting mechanism, on the other hand, must be coupled with racks 34 in programme shaft position II for input of a multiplier and in position V for presentation of a quotient.

Care must be taken that both mechanisms, for input of values, must not be coupled with racks 34, in their basic position, until shortly before the forward movement of racks 34 whilst, for presentation of values, they may be engaged with racks 34 even before the backward movement of the latter and must be disengaged therefrom before the forward movement thereof. As already described, this is achieved by the cams 263 and 268 on the main shaft 27 of the machine.

Thus, for input of a multiplier in programme shaft position II, cam 221 releases control bar 225 which is displaced rearwardly via step 270 and pin 269 only with the tripped slide 82, by the force of spring 231, pin 235 being pushed along switching edge 236 and coupling member 240 pivoting clockwise sufficiently for the front end thereof to come to rest below switching member 242. Shortly before racks 34 commence their forward movement, after approximately half a revolution of machine main shaft 27, cam 263, through roller 262, lever 259 and bar 258, causes tie-member 238 to rotate clockwise, so that the front end of coupling member 240 strikes against switching member 242 and rotates this latter with shaft 241. As described, frame 64 is thus pivoted downwardly and is only released again shortly before completion of the rotation of the machine main shaft 27, by bar 258 being restored by cam 263, and is disengaged or uncoupled forwards by displacement of control bar 225 via pin 269 of slide 82.

It is also the purpose of the pin 269 on slide 82 to lock the control bar 225 in its basic position when a fresh multiplicand is fed-in while programme shaft 71 is in position II.

After input of the multiplier, programme shaft 71 is moved to position IV in which preparation of the product ejection takes place. In position IV, cam 220 of programme shaft 71 releases control bar 226 which, when the machine main shaft 27 starts moving, is pushed rearwardly with rail 99 by spring 232 and, as described, via lever 246 and pin 248, causes coupling member 250 to pivot below switching member 255. Before racks 34 run from their basic position, tie-piece 252 with coupling member 250 is pivoted via the cam 263 of machine main shaft 27, roller arm 265 and bar 264, and, with it, frame 59 of the main counter mechanism is drawn downwardly through switching member 255, shaft 254 and switching frame 256. It is held in this position until racks 34 have reached their rear terminal position, where releasing follows due to the shape of cam 268 on machine main shaft 27.

The same operation, likewise tripped by cam 220 on programme shaft 71, occurs in the case of a division, in position III, where the main counter mechanism is coupled with racks 34 in order to eject a remainder. Engagement of the main counter mechanism for input of a dividend occurs in the zero position of the programme shaft. For the purpose, bar 247 is provided on slide 81 which is trippable by divide-key 6, pin 249 on bar 247 pivoting coupling member 251 into its operative position in a manner known per se. Cam 263 on the machine main shaft 27 does not draw in frame 59 with the main counter mechanism until racks 34 have achieved their rear terminal position.

Finally, to eject a quotient, the frame 64 of the rotary counter mechanism must be drawn in with programme shaft 71 in its position V. This is achieved by cam 222, via control bar 224 and coupling member 239. Again, engagement of frame 64 before outward movement of racks 34 is produced by cam 268 on machine main shaft 27.

Storage of results

In order to transmit the result of a multiplication or a division to an already mentioned totalising mechanism 47 or 48 (FIG. 2) without having to feed the calculated value into the calculating machine afresh, an auxiliary device is provided in the said machine, said device being adapted to be tripped by the machine main shaft 27 and controlled by programme shaft 71. The said arrangement makes it possible, by means of a calculated product or quotient, to solve addition or subtraction problems immediately afterwards.

As can be seen from FIGS. 7 and 8, a storage unit is-key 273 is expediently arranged in the function key area of the machine, alongside the is-key 7, key 273 being connected to is-key 7 as follows. As shown in FIG. 8, shank 126 of is-key 7 has on its side a lateral lug 274 which is engaged from above by a pin member 276 attached laterally on a shank 275 of the storage is-key 273. Pivotally attached to the lower end of shank 275 of key 273 is a lever 277 and a locking member 278. Engaging in an arcuate cut-out 279 in locking member 278 is a guide pin 280 which is attached in a lug 281 of a chassis plate 282. Locking member 278 has abutment edges 283 and 284 directed towards lug 274.

When the storage is-key 273 is depressed, is-key 7 is moved jointly downwards through pin 276 and lug 274, the guide pin 280 sliding upwardly in arcuate cut-out 279, causing locking member 278, with its edge 283, to pivot downwardly below lug 274, thus coupling both keys 7 and 273 together in the tripped position so that they can only return to their basic position once the is-key 7 has been released.

If only the is-key 7 is depressed, then lug 274 is moved in front of the abutment edge 284 of locking member 278 and so prevents subsequent operation of the storage is-key 273. FIG. 7 shows the is-key 7, the storage is-key 273 and the plus-key 2 which generally cuts in the storage mechanism 50. The plus-key 2 is pivotally connected through a key shaft 285 with a crank lever 286 pivotally mounted on spindle 120 and is held in its top inoperative position by a spring 287 engaging on the latter. A bent-over lug 288 on the crank lever 286 engages under a downwardly sloping switching shoulder 289 of a slide 292 running parallel with the already described slides 80 to 82 and displaceably and pivotally mounted through an elongated aperture 290 on a shaft 291, said slide 292, in its position of rest, bearing by the force of spring 293 on rail 110 through a shoulder 294. Slide 292 has a U-shaped recess 295 which likewise engages over rail 99.

Also illustrated in FIG. 7 is the hereinbefore described switching wheel 74 associated with the slide 82 which is adapted to be tripped by the is-key 7, together with a portion of programme shaft 71 on which cam 223 is attached.

Lever 277 pivoted to shank 275 of the storage is-key 273, as shown in FIG. 8, is shown in simplified form in FIG. 7 as a thrust bar 296 which is pulled by the force of spring 297 in the direction of a sloping bearing edge 298 of key shank 275. An angled end 299 on thrust bar 296 engages in a guide 300 in a plate 302 mounted on an operating rod 301. Operating rod 301 is arranged parallel to the programme shaft 71 in the machine and is axially slideably mounted. The force of a spring 305 draws operating rod 301 into a left-hand inoperative position in which stop 306 on said rod 301 abuts against machine frame 132.

By depressing the storage is-key 273, thrust bar 296 is displaced rearwardly by the bearing surface 298, the end 299 on the aforesaid bar 296 sliding in the guide 300 and displacing the plate 302, together with the operating rod 301, rightwards, so that the right-hand end of operating rod 301 comes within the region of rotation of cam 223 and, when programme shaft 71 is moved on into positions IV and V, comes in the path of cam projections 307, 307'. Since the operating rod 301 runs immediately under slide 292 of plus-key 2, the said rod raises the slide during its vertical movement and trips it as when the plus-key 2 is operated.

When the thus tripped slide 292 moves, upon the next rotation of the machine main shaft 27, rearwardly under the force of spring 293, a projection 308 arranged thereon causes a rocker 309 pivotally mounted on spindle 291 to be pivoted. Rocker 309 has, at its left-hand side, a hook-shaped switching member 310 which cooperates with a coupling bar 312 arranged in a rotatable and slideable manner above it on a spindle 311 rigid with the machine. On coupling bar 312 engages a spring 313 by which the said bar is held with a wheel 314 against cam 315 of the main shaft 27 of the machine and, in its inoperative position, with its left-hand end against a stop 316 rigid with the machine.

By rotation of the rocker 309 anti-clockwise, member 310 causes coupling bar 312 to pivot clockwise so that it engages in a recess 317 in a plate 318, slideable in the machine frame. In a guide 319 in plate 318 there is engaged a storage mechanism spindle 320 vertically slideably mounted in the machine frame 132, storage mechanism wheels 50 being pivotally mounted on said spindle 320. By means of cam 315, approximately after half a revolution of machine main shaft 27, coupling rod 312 is pushed forwards, said rod moving plate 318 with it when in the coupled position. By virtue of this displacement, storage mechanism spindle 320 is raised and storage mechanism wheels 50 brought into engagement with racks 34.

When storage is-key 273 is depressed, the particular calculating operation involved, which in any event is terminated by printing of a result, is initiated by the is-key 7, mechanically coupled with storage is-key 273, in the manner already described.

Simultaneously, through thrust bar 296, operating rod 301 is moved into the range of rotation of cam 223 on programme shaft 71. In the manner already described, both keys 7 and 273 are locked in the tripped position until completion of the calculation operation. After the actual multiplication or division operation and after any remainder has been ejected, programme shaft 71 is, moved through slide 82 into switch position IV or V in which one of the cam projections 307, 307' of cam 223 lifts operating rod 301. In turn, said rod 301 trips slide 292 which, when the machine main shaft 27 starts moving, is displaceable rearwardly and pivots rocker 309 through the medium of projection 308. Coupling bar 312 is thereby locked with plate 318. After machine main shaft 27 has rotated through an angle of approximately 180°, i.e. shortly before racks 34 are again displaced forwardly, cam 315 moves coupling bar 312 together with plate 318 forwardly, so engaging storage mechanism wheels 50 with racks 34. During the subsequent forward movement of racks 34, the printed result is fed into storage mechanism 50. Shortly before completion of the rotation of the machine main shaft 27, storage mechanism wheels 50 are again returned to the basic position by cam 315 and continued movement of programme shaft 71 into its zero position releases slide 292 and keys 7 and 273.

We claim:
1. In a calculating machine of the motor driven, print- ing type having at least three function keys for value input and for carrying out multiplication and division and having a rotatable main shaft connected to the drive motor and having a rotatable program control shaft with switching and control cams thereon for effecting the engagement and disengagement of setting, calculating, counting, and printing mechanisms and for controlling the means for driving and controlling the mechanisms and transmitting values therebetween, said program shaft making one half revolution made up of six steps (0, I, II, III, IV, V) during a complete calculating operation; a control device comprising; at least three differently toothed continuous-switching wheels on said program shaft, at least three parallel slides each pertaining to a respective wheel and each having a spring loaded pawl to engage the teeth of the respective wheel, latch means normally latching said slides in ineffective position, trip means for individually tripping said slides from the latched position thereof and operable by the respective function keys, and actuating means driven by said main shaft for reciprocating said slides when unlatched by their pertaining function keys, said slides being operable during a calculating operation to move said program shaft onwards stepwise in a correct sequence according to whether a multiplication or division cycle is being carried out, in one case said shaft being moved from its zero position once by two switching steps by a first one of said slides tripping a multiplier and, in another case being moved by a second one of said slides tripping a dividend input once by one step and, by subsequent tripping of a third one of said slides a plurality of times by two switching steps until it is moved into its zero position, said third slide rotating the program shaft on its last movement by only one step to reach the zero position thereof if the said slide at the commencement of the calculation was only moved by one step by said second slide.

2. A calculating machine according to claim 1 in which said function keys includes a times key and a divide key, said function key also including a result or is key common to multiplication and division operation, said mechanisms including a rotary counting mechanism for receiving a multiplier and a sum switching mechanism for receiving a divisor, said result key tripping values supplied to the machine into said rotary counting mechanism or into said sum switching mechanism in conformity with the rotated position of said program shaft, and also tripping the subsequent calculating operation until the result is printed.

3. A calculating machine according to claim 1 in which said actuating means includes a spindle swingable in the machine, a cam on the main shaft controlling the spindle, springs connected to the slides urging them toward said spindle, said latch means including a shoulder formed on each slide, and abutment means in the machine engageable by said shoulders to hold the slides against the bias of their respective springs until the slides are tripped.

4. A calculating machine according to claim 2 wherein during one rotation, two sets of six switching positions are associated with the program shaft, said two sets of six positions each forming a complete program for multiplication and division, the said slides being movable in each case by a travel corresponding to two steps, the said continuous switching wheel associated with the divide key and said second slide having only two oppositely disposed teeth thereon staggered by 30° each in relation to the zero position, the program shaft being moved onwards by only one step after operation of the divide key during input of a dividend into said main counting mechanism.

5. A calculating machine according to claim 2 wherein the said continuous-switching wheel associated with said first slide and the times key has two oppositely disposed teeth thereon each staggered by 60° in respect of the zero position, whereby the program shaft, after operation of the times key during feed-in of a multiplicand to the sum switching mechanism is immediately moved from its zero position by two switching steps and, upon further operation of the times key, remains in its second switching position for a possible alternation of the multiplicand.

6. A calculating machine according to claim 2 wherein the said continuous switching wheel associated with the result key and the said third slide has two sets of four oppositely disposed teeth thereon staggered by respectively 90°, 120°, 150° and 180° from the zero position, whereby the program shaft is shifted by operation of the result key after the divide key during input of a divisor into the sum switching mechanism, by two switching steps into a third switching position and, after calculation, during ejection of the balance, by a further two steps into a fifth switching position and, during automatic printing of the quotient, by one step into the sixth position or zero position, as a result of the gap between the teeth.

7. A calculating machine according to claim 2 wherein, by operation of the result key after the times key during input of a multiplier into said rotary counter mechanism, the program shaft is adapted to be shifted progressively via the continuous switching wheel pertaining to said third slide by two steps into a fourth and, after calculation and during the automatic printing of the product, by a further two steps, back into the zero position.

8. A calculating machine according to claim 2 which includes a rail pivotally arranged in the machine, a rail control cam on the program shaft controlling said rail, stops on the times key and on the divide key and on the result key cooperating with said rail so that in the zero position of the program shaft, the result key is locked by the rail against movement, and after depression of the divided key at least the times key is locked by the rail, and after operation of the times key at least the divide key is locked by the rail.

9. A calculating machine according to claim 8 wherein the said stop on the result key is formed as a pawl, a lateral arm on the result key pivotally supporting said pawl, a stop pin on the result key, said pawl resting in its inoperative position against said stop pin, said pawl having a locking edge engageable over said rail.

10. A calculating machine according to claim 9 wherein said rail is pivotable into three positions, lockingly engaging in the first position the stop on the result key, in the second position engaging the stop on the divide key and in the third position engaging both the stop on the times key and the stop on the divide key, while disengaging the stop on the result key in the second and third positions.

11. A calculating machine according to claim 9 in which the said rail control cam has, in the zero position of the program shaft, a cam projection at a maximum radius, a recess in the first switching position, and, in the second switching position, a medium-radius projection, while in the further switch positions of program shaft, a curved face is provided corresponding in radius to the recessed portion.

12. A calculating machine according to claim 9 in which a second pawl is pivotally mounted on said result key and is adapted for cooperating with a recess in said rail, said second pawl upon operation of said result key being hooked in said recess, a common spring connected between said second pawl and the first mentioned pawl on said result key and biasing both thereof, the said result key as well as said third slide adapted to be tripped thereby, being held in the engaged position until said rail, at the end of a calculating process, is again restored to its basic position by said rail control cam on the program shaft.

13. A calculating machine according to claim 2 which includes crank levers having stop edges thereon and pivotally arranged in the machine and connected to said times key, the divide key and said result key, respectively, each said crank lever being operable for disengaging a pertaining one of said slides from the latched position thereof upon actuation of the pertaining key, each crank lever having a stop edge, a common locking rail for said crank levers which, by operation of one of the said times, divide, or result key and through the associated crank lever is moved in front of said stop edges of the unactuated ones of said crank levers thereby locking them in inoperative position, each crank lever having a cutout to receive and engage the said rail when the respective function key is actuated.

14. An apparatus as claimed in claim 13, which includes control linkage connected to said locking rail and moved thereby, a latch to lock said control linkage in its actuated position, a drive motor, a normally disengaged single revolution coupling between the drive motor and the main shaft, a switch controlled by the linkage and connected in controlling relation to said motor, tripping means for said coupling controlled by said linkage, said latch and switch and tripping means being so related to said linkage that on the one hand actuation of said control linkage via said rail will cause the driving motor to be switched on and the machine coupling to be engaged and, on the other hand, said latch will retain the rail and control linkage in its actuated position until the machine is switched off, that is until the latch is returned to its inoperative position at the end of one revolution of said main shaft.

15. An apparatus as claimed in claim 14 which includes a spring-loaded detent means associated with said latch and said tripping means, said detent means holding the said tripping means after return thereof to its inoperative position and preventing repeated tripping of the machine coupling, if the particular function key which is operated is retained in its tripped position after the partial calculation operation tripped and carried out by it.

16. An apparatus as claimed in claim 2, which includes a storage cut-in member associated with said result key, engagement linkage liftable into tripped position, racks reciprocable in accordance with values set in the pin carriage of the machine, a storage mechanism, said engagement linkage being adapter when lifted to be moved into position to couple said storage mechanism to said racks, a lift cam on the program shaft for lifting said linkage into tripped position before providing the product or quotient, said cut-in member being operable to move said linkage into the range of said lift cam before providing the product or quotient, and cam means on the main shaft of the machine for coupling said storage mechanism to said racks, whereby, shortly after the product and/or quotient are ejected, the storage mechanism is coupled with said racks.

17. An apparatus as claimed in claim 16 in which the storage cut-in member is formed as a storage is-key adjacent to the is-key and adapted for being coupled therewith.

18. An apparatus as claimed in claim 17, which includes a switch pin attached laterally to the storage is-key, a stop member on the is-key, said switch pin engaging said stop member from above and carrying the is-key into a tripped position.

19. An apparatus as claimed in claim 18 which includes a locking member pivoted on the storage is-key and moveable laterally thereon when the storage is-key is depressed, said member having a switching edge which, when the is-key is depressed, bears laterally on the said stop on the is-key and prevents subsequent actuation of the storage is-key, said locking member having a locking edge running at right angles to the switching edge, actuation of said storage is-key prior to said is-key causing said locking edge to pivot under the stop on the is-key and lock the storage is-key in the tripped position to the is-key until the latter is released upon conclusion of the calculation operation and both said storage is-key and said is-key return to their basic position.

20. An apparatus as claimed in claim 16 in which said engagement linkage comprises a slide normally in locked position, a pivotable rocker operated by the slide, a device for coupling said storage mechanism to said racks and operated by said slide, an operating rod, a cam on the program shaft for lifting said rod, said rod engaging under the said slide and being raisable by either of two oppositely disposed projections on the said cam and extending over switch positions IV and V of the program shaft, said rod being raised by said cam to lift the slide out of its locked position before the product or quotient is ejected.

21. An apparatus as claimed in claim 16 in which said engagement linkage includes a further slide arranged parallel with the first, second and third slides and adapted to be tripped, for totalling calculations, a crank lever for tripping said further slide and operated by the plus-key, said further slide being actuated by the said actuating means for said first, second and third slides, and a pivoted rocker member actuated by said further slide and pertaining to the coupling of said storage mechanism to said racks.

22. An apparatus as claimed in claim 21, which includes a thrust bar actuated by said main shaft, a plate member adapted to be actuated by said thrust bar, a shaft supporting the wheels of said storage mechanism, guide slot means in said plate member engaging said shaft whereby actuation of said plate member by said thrust bar will couple said wheels with said racks, said rocker member when tilted by said further slide being operable for engaging said thrust bar with said plate member.

23. An apparatus as claimed in claim 22 in which said engagement linkage includes an axially displaceable operating rod, said lift cam being operable for raising said rod, said rod being axially displaceable into and out of the range of said lift cam, a plate connected to the rod, an angular guide slot in the plate, and a thrust rod engaging said slot and adapted to be moved at right angles to the operating rod by operation of the storage is-key and forming the storage cut-in member.

24. An apparatus as claimed in claim 2 which includes, a control rod, a cam on the program shaft holding the control rod in its basic position and operable to release the control rod in a predetermined position of the program shaft, a spring biasing said control rod away from its basic position, said control rod being moveable in unison with the slide pertaining to the result key when said slide is operated by said actuating means, a tie member, a coupling member pivoted on said tie member, a switching frame, said rotary counter mechanism having a pivotally supported frame moveable for pivoting the rotary counter mechanism into position for the input of a multiplier, said switching device being connected to said counter frame, and said rod when actuated displacing said coupling member so as to couple said switching frame via said tie member to said main shaft for actuation thereby.

25. An apparatus as claimed in claim 24, which includes a bar pivoted on the slide pertaining to said divide key, a main counting mechanism and a pivoted frame therefore, said frame being pivotal for input of a dividend into said main counting mechanism, a second coupling member, a second switching frame connected to the frame of said main counting mechanism, a second tie member pivotally supporting said second coupling member, said second coupling member being operable when displaced for coupling said second switching frame via said second tie member to the said main shaft for actuation thereby, and means operable upon actuation of said divide key for causing said bar to engage and displace said coupling member.

26. An apparatus as claimed in claim 25, which includes a cam member mounted on the machine main shaft, a roller engaging said cam member, a roller arm supporting the roller, and a link connecting said roller arm to said time members, said cam member after approximately half a main shaft revolution, pivoting said tie members via said roller and roller arm and link.

27. An apparatus as claimed in claim 26 in which the machine main shaft is fitted to a further cam member similar to, but staggered by 180° in respect of the first mentioned cam member, a further roller arm and having a roller thereon engaging said further cam member, two further tie members pivotally connected to the said frame of the main counter mechanism and the said frame of the rotary counter mechanism respectively and adapted for being coupled thereto, said further cam member pivoting said further tie members via said further roller arm immediately after the machine main shaft has started to move.

28. An apparatus as claimed in claim 27, which includes a second control rod, a second cam on said program shaft holding said second control rod in its basic position and operable to release the second rod in a predetermined position of the program shaft, a spring biasing said second control rod away from its basic position, said second control rod when released from its basic position reciprocating in unison with said slides, a bar element, said second control rod actuating said bar element which in turn actuates said second coupling member, said bar element in actuating said second coupling member accomplishing the ejection of a product or division quotient.

29. An apparatus as claimed in claim 28 in which another coupling member is pivoted on the said fruther tie member pertaining to said rotary counter, a further control bar for pivoting said other coupling member into coupling position, a switching cam on the program shaft for tripping said further control bar, said further control bar being spring displaceable and coupling the frame of the said rotary counter mechanism with the said switching frame pertaining thereto for the ejection of a quotient.

References Cited by the Examiner

UNITED STATES PATENTS

| | | | |
|---|---|---|---|
| 3,024,975 | 3/1962 | Sundstrand | 235—60 |
| 3,079,073 | 2/1963 | Heinze et al. | 235—60.15 |
| 3,145,923 | 8/1964 | Chall | 235—60 |

RICHARD B. WILKINSON, *Primary Examiner.*

STEPHEN J. TOMSKY, *Assistant Examiner.*